(12) United States Patent
Koike et al.

(10) Patent No.: US 7,965,055 B2
(45) Date of Patent: Jun. 21, 2011

(54) CONTROL DEVICE OF WORK POSITIONING APPARATUS

(75) Inventors: Takeshi Koike, Fujisawa (JP);
Masayuki Shigeyoshi, Fujisawa (JP);
Masaki Shibaike, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 638 days.

(21) Appl. No.: 12/030,668

(22) Filed: Feb. 13, 2008

(65) Prior Publication Data

US 2008/0243306 A1 Oct. 2, 2008

(30) Foreign Application Priority Data

Mar. 26, 2007 (JP) ................................ 2007-078209

(51) Int. Cl.
*B25J 9/10* (2006.01)
*B23K 37/047* (2006.01)
*B23K 9/095* (2006.01)

(52) U.S. Cl. ............... 318/568.18; 318/566; 318/565; 318/568.2; 700/249; 700/255; 700/248; 901/42; 901/8

(58) Field of Classification Search ... 701/1; 318/568.2, 318/568.21, 574, 568.19, 568.11, 568.12, 318/568.1, 567, 565, 566, 568.18; 700/245, 700/250, 249, 255, 248; 901/1, 42, 8
See application file for complete search history.

(56) References Cited

U.S. PATENT DOCUMENTS

| | | | | |
|---|---|---|---|---|
| 4,831,547 A | * | 5/1989 | Ishiguro et al. | 700/247 |
| 4,853,603 A | * | 8/1989 | Onoue et al. | 700/262 |
| 5,020,001 A | * | 5/1991 | Yamamoto et al. | 700/247 |
| 5,053,976 A | * | 10/1991 | Nose et al. | 700/251 |
| 5,197,846 A | * | 3/1993 | Uno et al. | 414/731 |
| 5,214,748 A | * | 5/1993 | Wakayama et al. | 700/247 |
| 5,222,199 A | * | 6/1993 | Minami et al. | 700/251 |
| 5,412,759 A | * | 5/1995 | Yano et al. | 700/248 |

(Continued)

FOREIGN PATENT DOCUMENTS

JP 6-170531 6/1994

(Continued)

OTHER PUBLICATIONS

Japanese Notification of Reason(s) For Refusal, with English translation, issued Nov. 30, 2010 in connection with Japanese Patent Application No. 2007-078209.

*Primary Examiner* — Ronnie Mancho
(74) *Attorney, Agent, or Firm* — Oblon, Spivak, McClelland, Maier & Neustadt, L.L.P.

(57) ABSTRACT

A control device of a work positioning apparatus includes an operating limit line storage unit for storing position coordinates of an operating limit line, a speed reduction zone storage unit for storing a width of a speed reduction zone ranging from a reduction start position to the operating limit line, a check point storage unit for storing position coordinates of check points set in the work, a check point updating unit for determining position coordinates of the check points moved in accordance with an operation of the work positioning apparatus by calculation, an in-speed-reduction-zone determining unit for determining whether the check points enter the speed reduction zone in accordance with the updated position coordinates of the check points, and a work positioning apparatus control unit for instructing a work positioning apparatus motor to reduce a speed if the check points are determined to enter the speed reduction zone.

9 Claims, 7 Drawing Sheets

U.S. PATENT DOCUMENTS 5,596,683 A * 1/1997 Kasagami et al. ............ 700/248
6,822,412 B1 * 11/2004 Gan et al. ................. 318/568.19
7,054,775 B2 * 5/2006 Rosenberg et al. ............ 702/95

FOREIGN PATENT DOCUMENTS

| JP | 08-234842 | 9/1996 |
| JP | 10-232706 | 9/1998 |
| JP | 11-170186 | 6/1999 |
| JP | 2001-252849 | 9/2001 |
| JP | 2002-336984 | 11/2002 |
| JP | 2005-014133 | 1/2005 |
| JP | 2005-161376 | 6/2005 |
| JP | 2006-011730 | 1/2006 |
| JP | 2006-059187 | 3/2006 |

* cited by examiner

CONTROL DEVICE OF WORK POSITIONING APPARATUS

BACKGROUND OF THE INVENTION

1. Field of the Invention

The present invention relates to a control device of a work positioning apparatus, and more specifically to a control device of a work positioning apparatus for adjusting a work position to a given position in a three-dimensional space at the time of welding with a welding robot.

2. Description of the Related Art

Conventional work positioning apparatuses (positioners) for adjusting a work position at the time of welding with an arc welding robot include a rotating shaft, an inclination shaft for rotating a work fixed onto a stage rotatable with the rotating shaft in a vertical plane, and a vertical shaft for vertically moving the stage. In the case of welding a work that largely extends off a stage with such a positioner having three shafts, if a posture of the work is changed, the work would collide with the floor or the positioner. To overcome this problem, a method of preventing a work from interfering with the floor or other such obstacles (for example, see Japanese Unexamined Patent Application Publication No. 2005-161376).

The method as disclosed in Japanese Unexamined Patent Application Publication No. 2005-161376 calculates a degree of interference with the floor or the like at the time of rotating, inclining, or vertically moving a work based on an external size of the work and the degree at which the work decenters from a rotation center of the stage in a to-and-fro direction, a side-to-side direction, and a vertical direction of the work, and sends a signal right before the work interferes with the floor or the like to bring the positioner to an emergency stop in response to the signal.

However, the method as disclosed in Japanese Unexamined Patent Application Publication No. 2005-161376 sends a signal right before a work interferes with the floor or the like and thus involves a possibility of the work colliding against the floor or the like. This is because a stage being moved cannot suddenly stop. In short, it takes a certain period of time to completely stop rotations of motors for driving three shafts of a positioner after the motors receive signals for stopping each motor, and a stage having the work fixed thereonto is coasting during that period. In particular, a heavier or longer work moves at higher acceleration and thus, coasts for a longer time and has a higher possibility of colliding with the floor or the like.

SUMMARY OF THE INVENTION

Accordingly, it is an object of the present invention to provide a control device of a work positioning apparatus, which can overcome the above problem and prevent the work positioning apparatus or a work fixed to the work positioning apparatus from colliding against an obstacle, and a control program used therein.

The present invention has been accomplished with a view to attaining the above object. A control device of a work positioning apparatus for controlling the work positioning apparatus including a stage for fixing a work, and an inclination shaft, a rotating shaft, and a vertical shaft for securing the fixed work in a predetermined position in a three-dimensional space, comprising:

operating limit line storage means for storing position coordinates of an operating limit line that is preset in front of a predetermined obstacle with respect to the work positioning apparatus or the work fixed to the work positioning apparatus;

speed reduction zone storage means for storing a width of a speed reduction zone ranging from a reduction start position preset in front of the operating limit line to the operating limit line;

check point storage means for storing position coordinates of one or more check points set in the work positioning apparatus or the work fixed to the work positioning apparatus;

check point updating means for determining position coordinates of the check points moved in accordance with an operation of the work positioning apparatus by calculation to update position coordinates stored in the check point storage means;

in-speed-reduction-zone determining means for determining whether any one of the check points enters the speed reduction zone in accordance with the updated position coordinates of the check points; and work positioning apparatus control means for instructing a work positioning apparatus motor for driving the work positioning apparatus to reduce a speed if any one of the check points is determined to enter the speed reduction zone.

With this structure, the control device of a work positioning apparatus stores position coordinates of the preset operating limit line, speed reduction zone, and check points and determines whether any one of the check points moves and enters the speed reduction zone in accordance with an operation of the work positioning apparatus with the in-speed-reduction-zone determining means. If any one of the check points is determined to enter the speed reduction zone, the control device instructs the work positioning apparatus motor to reduce a speed with the work positioning apparatus control means. Since a speed reduction zone is set in accordance with a coasting period or distance corresponding to a stop time of the work positioning apparatus, the work positioning apparatus or the work fixed thereto can be securely prevented from colliding against an obstacle. In this example, the check point may be set on either the work positioning apparatus or the work fixed thereto. Alternatively, the check point may be set in somewhere away from the work positioning apparatus or work. In this way, the check point can be freely set. Thus, the check point is set in the best position in accordance with a work's size or shape to thereby ease constrains on a movable area of the work positioning apparatus on a stage.

Further, in the control device of a work positioning apparatus according to the present invention, the work fixed to the work positioning apparatus may be welded with a welding wire supplied from a welding torch attached to an arc welding robot, and the control device may further include: arc welding robot control means for instructing an arc welding robot motor for driving the arc welding robot to reduce a speed if any one of the check points enters the speed reduction zone; and welding control means for instructing the welding torch to stop supplying the welding wire if any one of the check points enters the speed reduction zone.

With this structure, the control device of a work positioning apparatus can stop operations of the arc welding robot in sync with stopping of the work positioning apparatus if any one of the check points enters the speed reduction zone as well as cut arc discharge from the welding torch. Hence, it is possible to avoid such a situation that only the work positioning apparatus stops operating to interrupt a welding operation and to realize a safe and efficient welding operation.

Further, in the control device of a work positioning apparatus according to the present invention, the speed reduction zone may be set using a distance from the operating limit line as a parameter.

With this structure, the control device of a work positioning apparatus can easily change a width of the speed reduction zone because the speed reduction zone is set using a distance from the operating limit line as a parameter.

Further, the control device of a work positioning apparatus according to the present invention may further include: means-for-judging-necessity-of-determiantion-about-speed-reduction-zone for determining which of the operating limit line and any one of the check points is positioned farther from a work origin of the work positioning apparatus on a rotating shaft for rotating the stage, wherein if any one of the check points is farther from the work origin as a result of the determination, the work positioning apparatus control means instructs the work positioning apparatus motor to reduce a speed, the arc welding robot control means instructs the arc welding robot motor to reduce a speed, and the welding control means instructs the welding torch to stop supplying the welding wire.

With this structure, the control device of a work positioning apparatus executes speed-reduction processing to stop operations of the work positioning apparatus or a welding operation if the means-for-judging-necessity-of-determiantion-about-speed-reduction-zone determines that any one of the check points is farther from the work origin than the operating limit line. Conversely, in the control device of a work positioning apparatus, if the means-for-judging-necessity-of-determiantion-about-speed-reduction-zone determines that the operating limit line work origin is farther from the work origin than any one of the check points, none of the check points move beyond operating limit line in accordance with rotation about the work origin. In general, the control device needs to perform determination with the in-speed-reduction-zone determining means in succession. However, if any one of the check points is closer to the work origin, such sequential complicated determination processing can be skipped. Therefore, the control device can reduce a processing load on a CPU etc., improve a running performance for executing a program, and reduce CPU or memory utilization. In addition, in the case where any one of the check points is closer to the work origin, even if entering the speed reduction zone, the check point never moves beyond the operating limit line, resulting in an advantage that an operating range can be widened compared with the case where a speed is reduced each time the check point enters the speed reduction zone.

Further, the control device of a work positioning apparatus according to the present invention may further include: moving direction determining means for determining whether a moving direction of any one of the check points extends to increase a distance from the operating limit line, wherein if a moving direction of any one of the check points extends to decrease a distance from the operating limit line as a result of the determination, and any one of the check points enters the speed reduction zone, the work positioning apparatus control means instructs the work positioning apparatus motor to reduce a speed, the arc welding robot control means instructs the arc welding robot motor to reduce a speed, and the welding control means instructs the welding torch to stop supplying the welding wire.

With this structure, the control device of a work positioning apparatus executes speed-reduction processing to stop operations of the work positioning apparatus or a welding operation if the moving direction determining means determines that a moving direction of any one of the check points extends to decrease a distance from the operating limit line, and any one of the check points enters the speed reduction zone. Conversely, if the moving direction determining means determines that a moving direction of any one of the check points extends to increase a distance from the operating limit line, there is no fear of colliding against an obstacle, so the control device of a work positioning apparatus does not perform speed-reduction processing to stop operations of the work positioning apparatus or a welding operation. Hence, the control device can reduce a processing load on a CPU etc., improve a running performance for executing a program, and reduce CPU or memory utilization. In addition to the above advantage, in the case where any one of the check points is within the speed reduction zone, the check point can be moved to a normal operation zone from the speed reduction zone without any special operation, which enables easy recovery.

Further, the control device of a work positioning apparatus according to the present invention may further include: speed reduction zone storage means for storing an emergency reduction time shorter than a normal reduction time as a reduction time detected when a halt command is externally input, wherein if a moving direction of any one of the check points extends to decrease a distance from the operating limit line as a result of the determination, the work positioning apparatus control means instructs the work positioning apparatus motor to reduce a speed in the emergency reduction time.

With this structure, if a moving direction of any one of the check points extends to decrease a distance from the operating limit line, the control device of a work positioning apparatus can bring the work positioning apparatus to an emergency stop in an emergency reduction time shorter than a normal reduction time as a reduction time detected when a halt command is externally input. With this structure, the speed can be reduced in the emergency reduction time, so a coasting distance can be reduced compared with the case of reducing a speed in the normal reduction time. As a result, an operating range of the work positioning apparatus can be widened.

Further, the control device of a work positioning apparatus according to the present invention may further include: operating limit determining means for determining whether any one of the check points approaches the obstacle beyond the operating limit line, wherein if any one of the check points is beyond the operating limit line, the work positioning apparatus control means instructs the work positioning apparatus motor to rotate to move the check point back to position coordinates updated before the check point gets beyond the operating limit line.

With this structure, if the operating limit determining means determines that any one of the check points approaches an obstacle beyond the operating limit line, the control device of a work positioning apparatus instructs the work positioning apparatus motor to move the check point to position coordinates updated before the check point gets beyond the operating limit line. In other words, the control device forcedly stops the work positioning apparatus motor, not decelerating the work positioning apparatus motor toward a target position. Hence, the work positioning apparatus or the work fixed thereto can be securely prevented from colliding against an obstacle.

Further, in the control device of a work positioning apparatus according to the present invention, the operating limit line may be set using a coordinate value of a world coordinate system using a parameter.

With this structure, the operating limit line is set using a coordinate value of a world coordinate system using a parameter, so the control device of a work positioning apparatus can easily change a coordinate value of the operating limit line in accordance with the coordinate value of the world coordinate system.

Further, in the control device of a work positioning apparatus according to the present invention, the operating limit line may be set using a coordinate value of a robot-based coordinate system, which is fixed in the arc welding robot, as a parameter.

With this structure, the operating limit line is set using a coordinate value of a robot-based coordinate system, which is fixed in the arc welding robot, as a parameter, so the control device of a work positioning apparatus can easily change a coordinate value of the operating limit line in accordance with position coordinates of the arc welding robot.

As described above, according to the present invention, control device of a work positioning apparatus, it is possible to prevent a work positioning apparatus or a work fixed to the work positioning apparatus from colliding against an obstacle and to ease constraints on a movable range of a work positioning apparatus.

BRIEF DESCRIPTION OF THE DRAWINGS

FIGS. 3A and 3B schematically illustrate the layout of check points, in which

FIGS. 6A to 6C illustrate a layout example of check points, in which

DESCRIPTION OF THE PREFERRED EMBODIMENTS

Hereinafter, a control device of a work positioning apparatus according to the best mode for carrying out the present invention (hereinafter referred to as "embodiment") will be described with reference to the accompanying drawings.
(Outline of Control Device of Work Positioning Apparatus)

Figure 1:
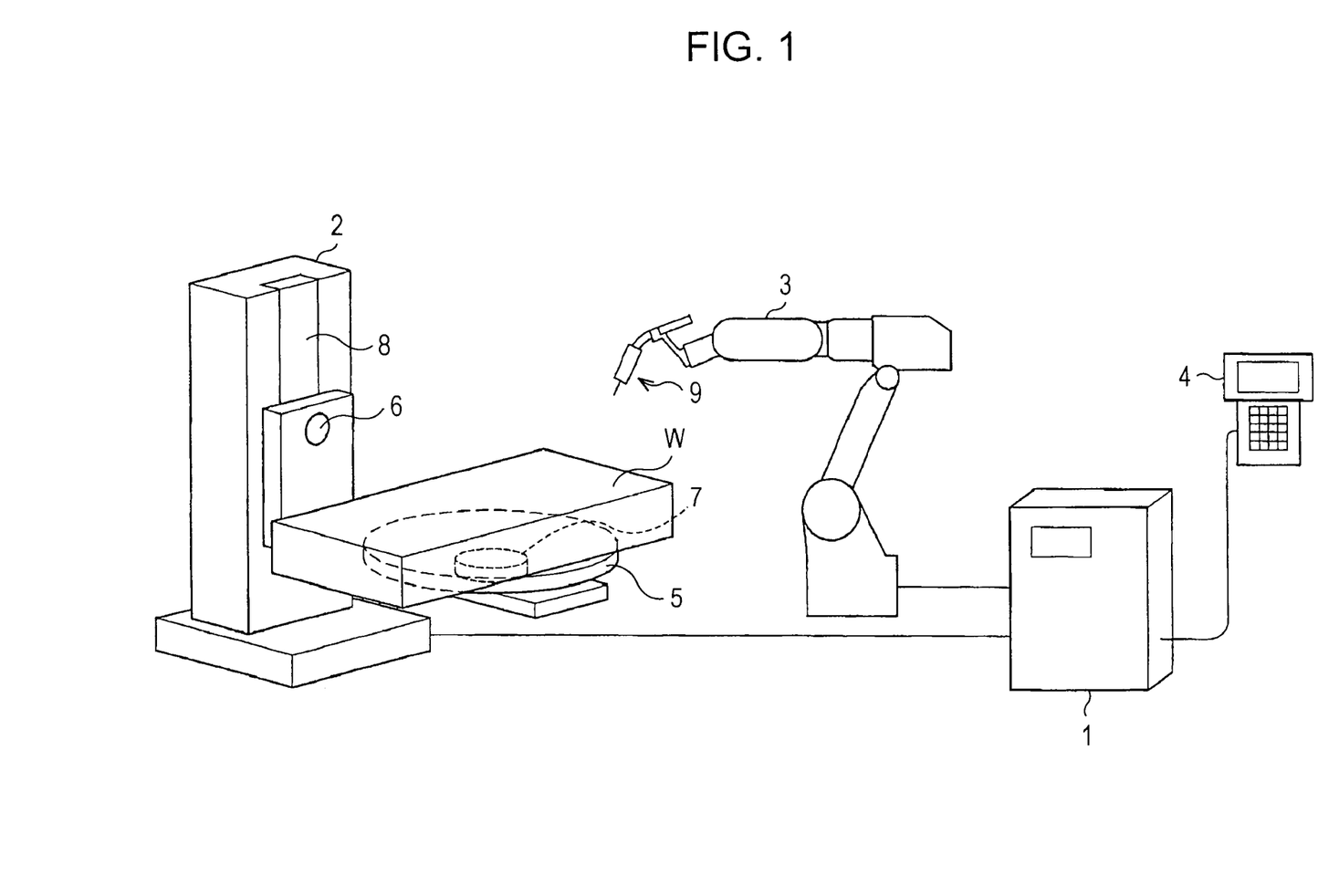
FIG. 1 is a schematic diagram of a control device of a work positioning apparatus according to an embodiment of the present invention.

FIG. 1 is a schematic diagram of a control device of a work positioning apparatus according to an embodiment of the present invention. A control device (control device of a work positioning apparatus) 1 is connected to a positioner (work positioning apparatus) 2, a manipulator (arc welding robot) 3, and a teaching pendant 4. The device 1 controls the positioner 2 and the manipulator 3 based on a command input from the teaching pendant 4 or a certain prestored teaching program.

The positioner 2 includes a disk-like stage 5, on which a work W is fixed, an inclination shaft 6 for rotationally tilting the stage 5 in a vertical plane, a rotating shaft 7 for rotating the stage 5 in a horizontal plane, and a vertical shaft 8 for moving the stage 5 up and down along a vertical direction. The positioner 2 can secure the work W fixed to the stage 5 in a predetermined position of a three-dimensional space by the inclination shaft 6 or the rotating shaft 7 moving to a predetermined angle by rotation or the vertical shaft 8 moving up or down to a predetermined height in accordance with operations of an internal positioner motor (work positioning apparatus motor) $M_P$ (see FIG. 2) based on a motor command signal from the control device 1.

The manipulator 3 is, for example, a 6-axis vertical articulated robot, and a welding torch 9 is attached to the wrist of the manipulator 3. The manipulator 3 can move the welding torch 9 to a predetermined position in accordance with an operation of an internal manipulator motor (arc welding robot motor) $M_M$ (see FIG. 2) based on a motor command signal from the control device 1.

The welding torch 9 supplies a welding wire to a welding target portion of the work W. Arc discharge occurs between the welding wire and the target portion to execute welding. The welding torch 9 is connected to a welding power source $P_W$ (see FIG. 2) through a wire supplying device (not shown), and the welding power source $P_W$ is connected to the control device 1. When the control device 1 outputs a welding command signal to the welding power source $P_W$, the welding power source $P_W$ supplies power to drive the wire supplying device (not shown) to thereby supply the welding wire to the welding torch 9.

The teaching pendant 4 is used to input a welding path to the target portion upon teaching operations of the positioner 2 or the manipulator 3. In this embodiment, the teaching pendant 4 can input a halt command to stop the positioner 2 or the manipulator 3 to the control device 1 in accordance with operator's manipulation. Further, the teaching pendant 4 includes an alarm that rings for reporting an error in accordance with a warning message output from the control device 1.

[Configuration of Control Device]

Figure 2:
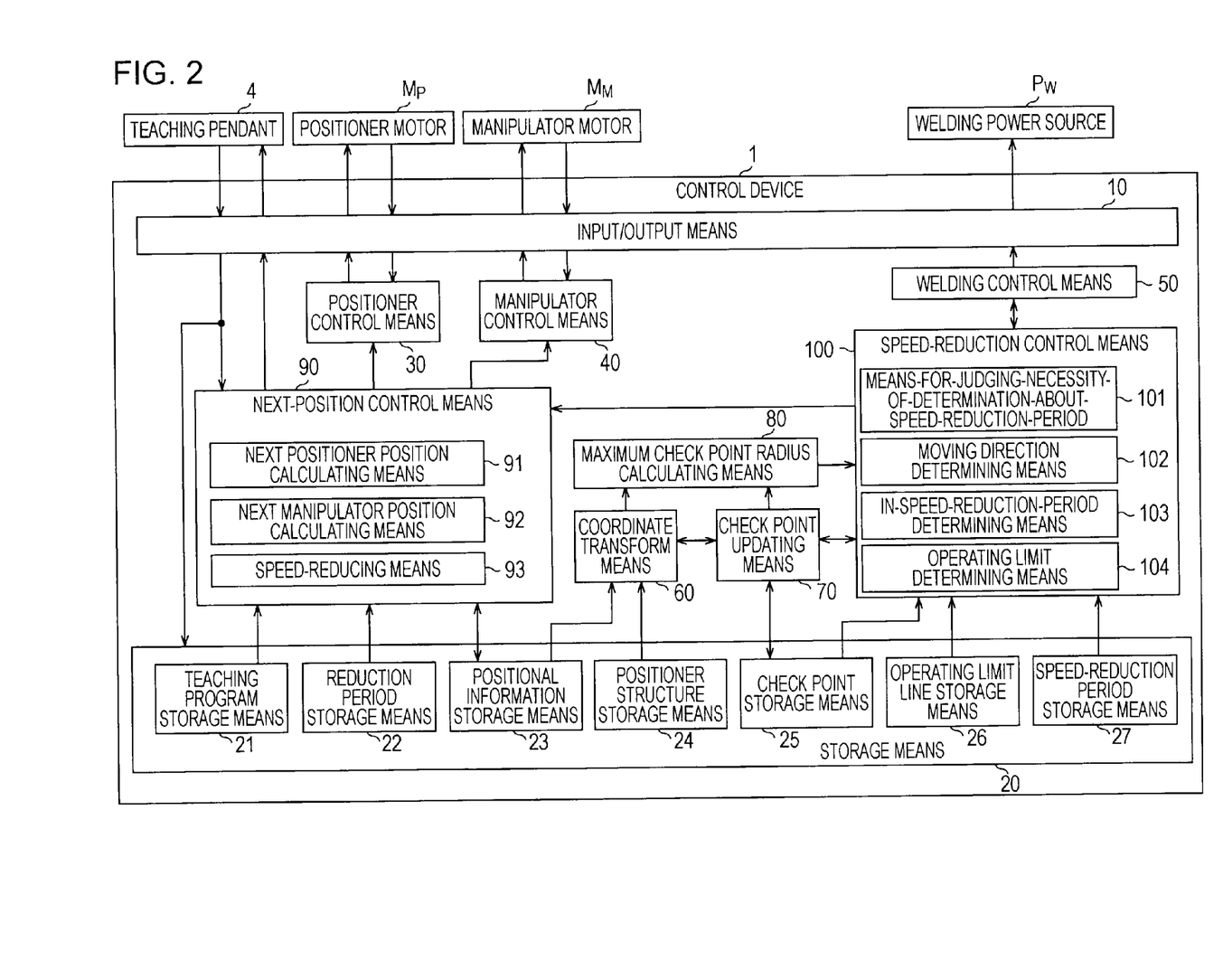
FIG. 2 is a schematic block diagram of the control device of FIG. 1.

FIG. 2 is a schematic block diagram of the control device of FIG. 1. The control device 1 includes, for example, a CPU (Central Processing Unit), a ROM (Read Only Memory), a RAM (Random Access Memory), an HDD (Hard Disk Drive), and an input/output interface. Further, in order to realize the following functions, the control device 1 include, as shown in FIG. 2, an input/output means 10, a storage means 20, a positioner control means (work positioning apparatus control means) 30, a manipulator control means (arc welding robot control means) 40, a welding control means 50, a coordinate transform means 60, a check point updating means 70, a maximum checkpoint radius calculating means 80, a next-position control means 90, and a speed-reduction control means 100. The configuration of the control device 1 is described hereinbelow with reference to FIG. 2 (optionally to FIG. 1).

(Input/Output Means)

The input/output means 10 includes predetermined input interface and output interface. In FIG. 2, the interfaces are integrated for ease of illustration but are separately configured in practice. The input/output means 10 inputs commands or data input from the teaching pendant 4 to the storage means 20 or the next-position control means 90, and outputs information sent from the next-position control means 90 (warning information or the like) to the teaching pendant 4. In addition, the input/output means 10 outputs a welding command signal sent from the welding control means 50 to the welding power source $P_W$.

The input/output means 10 outputs a motor command signal (next output position) sent from the positioner control means 30 to the positioner motor $M_P$, and inputs a motor output signal (current position) output from the positioner motor $M_P$ to the positioner control means 30. Further, the input/output means 10 outputs a motor command signal (next output position) sent from the manipulator control means 40 to the manipulator motor $M_M$, and inputs a motor output signal (current position) output from the manipulator motor $M_M$ to the manipulator control means 40.

(Storage Means)

The storage means 20 includes, for example, a ROM, a RAM, an HDD, a teaching program storage means 21, a speed reduction zone storage means 22, a positional information storage means 23, a positioner structure storage means 24, a check point storage means 25, an operating limit line storage means 26, and a speed reduction zone storage means 27. In FIG. 2, the storage means 20 is integrated for ease of illustration but may be individually configured.

(Teaching Program Storage Means)

The teaching program storage means 21 stores a teaching program describing positions of the manipulator 3 and the positioner 2. The teaching program stored in the teaching program storage means 21 is preset but can be edited by entering data with the teaching pendant 4 or a connected device such as a personal computer (not shown).

(Speed Reduction Zone Storage Means)

The speed reduction zone storage means 22 stores a normal reduction time as a reduction time detected when a halt command is externally input from the teaching pendant 4, and an emergency reduction time shorter than the normal reduction time. Here, the normal reduction time refers to a time necessary to stop the positioner 2 that is operating. Further, since the working positioner 2 and manipulator 3 are stopped at the same time, the normal reduction time means a time necessary to stop the manipulator 3 during operation.

(Positional Information Storage Means)

The positional information storage means 23 includes a memory area for temporarily storing the next output positions of the positioner motor $M_P$ and the manipulator motor $M_M$ calculated with the next-position control means 90, and a storage area for restoring the next output positions of each motor as previous positions after motor command signals representing the motor next output positions are output to each motor.

(Positioner Structure Storage Means)

The positioner structure storage means 24 stores information about the configuration of the positioner 2, that is, the origin fixed to the ground based on a mounting position of the positioner 2 (positioner-based origin), the angle of the inclination shaft 6 of the positioner 2, the angle of the rotating shaft 7, the height of the vertical shaft 8, a link structure of these shafts, and a link length of each shaft. In this embodiment, the positioner-based origin ($O_W$ (see FIGS. 3A and 3B)) is determined based on the origin of a world coordinate system (not shown).

(Check Point Storage Means)

The check point storage means 25 stores position coordinates of one or more check points set in the work W fixed to the stage 5 of the positioner 2. More specifically, the check point storage means 25 has an area for storing preset position coordinates of check points (initial position coordinates based on the positioner work origin Op of FIGS. 3A and 3B), an area for temporarily storing a current position of a selected check point (world coordinate value CP), and an area for storing the previous position of the selected check point (world coordinate value $CP_{old}$).

Figure 3A:
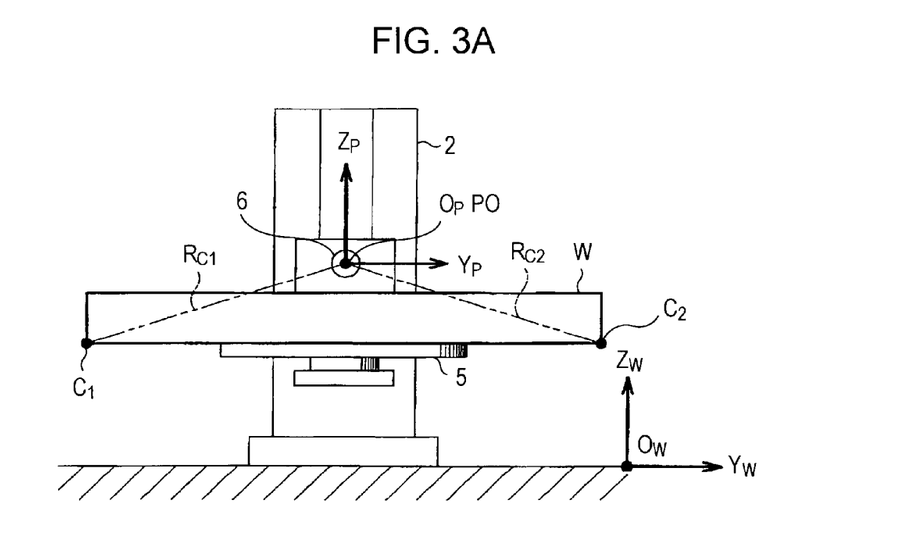
FIG. 3A is a side view of a positioner as viewed from a positive direction of an X axis.
Figure 3B:
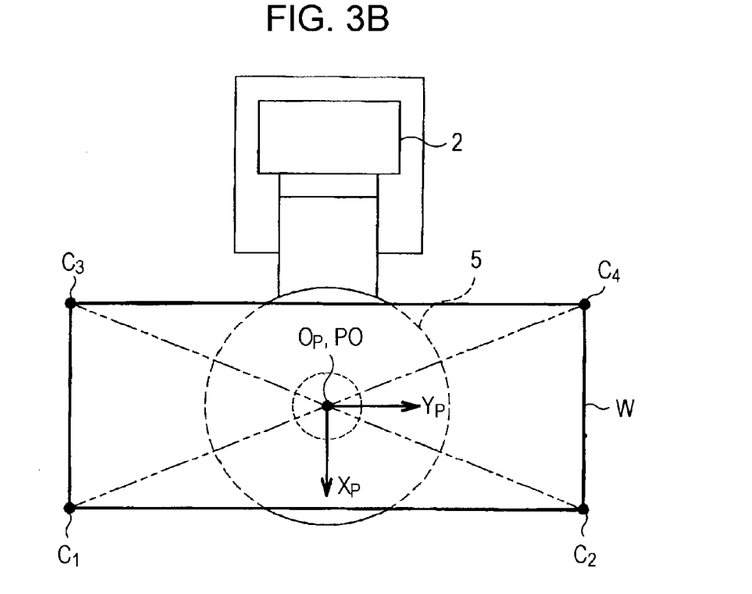
FIG. 3B is a plan view of the positioner as viewed from a positive direction of a Z axis.

The layout of the check points is described next with reference to FIGS. 3A and 3B. FIGS. 3A and 3B schematically illustrate the layout of check points. FIG. 3A is a side view of a positioner as viewed from a positive direction of an X axis, and FIG. 3B is a plan view of the positioner as viewed from a positive direction of a Z axis. The positioner work origin $O_P$ is the origin (0, 0, 0) of positioner work origin coordinate system ($X_P$, $Y_P$, $Z_P$) fixed at a predetermined height of the rotating shaft 7 of the positioner 2. The positioner work origin $O_P$ changes its position together with the stage 5 in accordance with the rotation of the inclination shaft 6. Check points $C_1$ to $C_4$ are determined based on a distance from the positioner work origin $O_P$. Thus, the check points $C_1$ to $C_4$ are fixed with respect to the work W. For example, the maximum checkpoint radius calculating means 80 references distances $R_{c1}$ and $R_{c2}$ of FIG. 3A as characteristic amounts that specify the check points $C_1$ and $C_2$ as described below.

In this embodiment, as shown in FIG. 3A, the positioner-based origin $O_W$ of the world coordinate system ($X_W$, $Y_W$, $Z_W$) is set to a predetermined position on the floor. The above positioner structure storage means 24 stores a coordinate value of the positioner work origin $O_P$ based on the origin $O_W$ of the world coordinate system ($X_W$, $Y_W$, $Z_W$). The positioner work origin represented in coordinates of the world coordinate system ($X_W$, $Y_W$, $Z_W$) is expressed as (PO), and the positioner work origin represented in coordinates of the positioner work origin coordinate system ($X_P$, $Y_P$, $Z_P$) is expressed as ($O_P$). That is, a coordinate value of the positioner work origin, which represents the same position in FIGS. 3A and 3B, is expressed in two patterns: (PO) and ($O_P$).

Referring to FIG. 2, the storage means 20 is described in more detail.

(Operating Limit Line Storage Means)

The operating limit line storage means 26 stores position coordinates of an operating limit line preset in front of a predetermined obstacle with respect to the work W fixed to the stage 5 of the positioner 2 in association with each check point. The operating limit line is determined in accordance with a preset coasting period or distance corresponding to a stop time of the positioner 2. Examples of the obstacle include base portion, pillar portion, and top portion of the positioner 2 as well as the floor (ground). The following description is made of an operating limit line (operating limit line in a Z− direction) set with respect to the floor as an obstacle. Here, the operating limit line can be set in an X+ direction, an X− direction, a Y+ direction, a Y− direction, a Z+ direction, and a Z− direction. To be specific, if the pillar portion of the positioner 2 is an obstacle, the operating limit line is set in the X− direction, and if the top portion (not shown) of the positioner 2 is an obstacle, the operating limit line is set in the Z+ direction.

(Speed Reduction Zone Storage Means)

Figure 4:
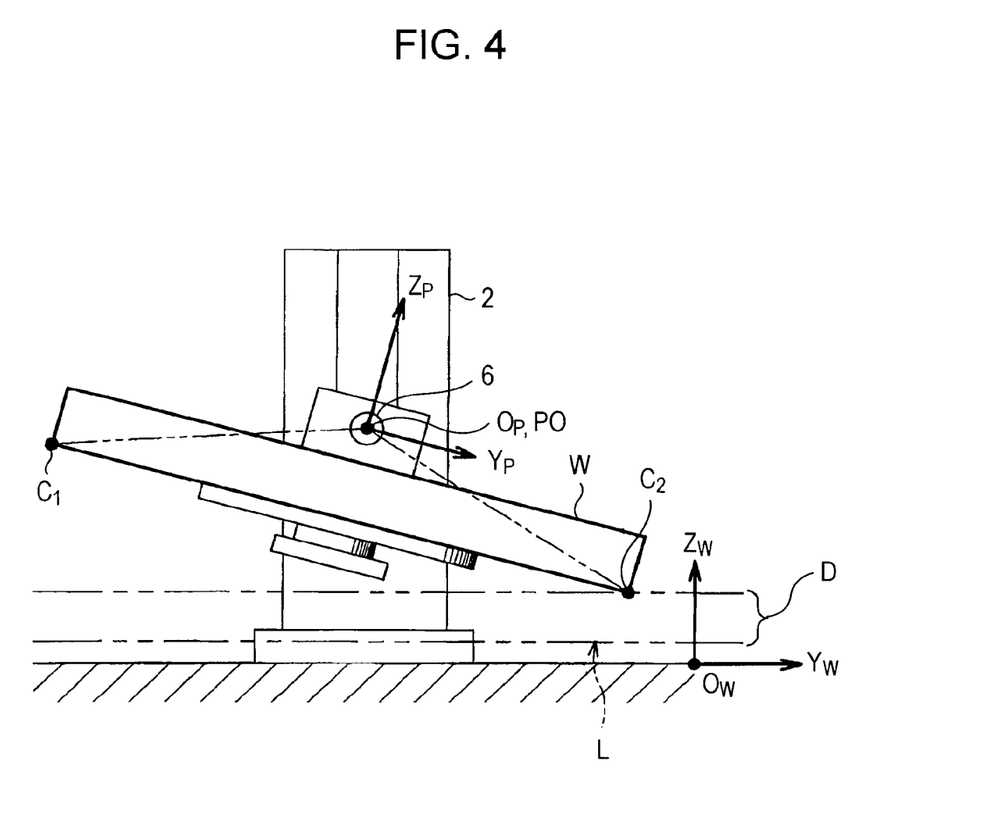
FIG. 4 illustrates an operating limit line and a speed reduction zone as viewing the positioner from a positive direction of an X axis.

The speed reduction zone storage means 27 stores a width of a speed reduction zone ranging from a speed-reduction start position preset in front of the operating limit line and the operating limit line. The speed reduction zone is determined in accordance with a coasting period or distance corresponding to a stop time of the positioner 2. Referring now to FIG. 4, specific examples of the operating limit line and the speed reduction zone are described. FIG. 4 illustrates an operating limit line and a speed reduction zone as viewing the positioner from a positive direction of an X axis. In this embodiment, an operating limit line L of the positioner 2 is determined using a coordinate value of the world coordinate system ($X_W$, $Y_W$, $Z_W$) as a parameter. For example, if the operating limit line is set 100 mm above the floor where the positioner origin of the world coordinate system ($X_W$, $Y_W$, $Z_W$) is set, the operating limit line L is represented by "Z− direction 100 mm".

An area between the work W side (inner side) speed-reduction start position and the obstacle side (outer side) operating limit line L is referred to as a speed reduction zone D. In this embodiment, a width of the speed reduction zone D is determined using a distance up to the speed-reduction start position in a direction from each operating limit line L to the work W side (inner side) as a parameter. For example, if the operating limit line L is set 100 mm above the floor as described above and the speed-reduction start position is set 200 mm above the floor, the speed reduction zone D is represented by "Z– directional speed-reduction start distance 100 mm".

Referring back to FIG. 2, the configuration of the control device 1 is described in more detail.

(Positioner Control Means)

The positioner control means (work positioning apparatus control means) 30 instructs the positioner motor $M_P$ for driving the positioner 2 to reduce a speed if any check point enters the speed reduction zone. The positioner control means 30 obtains a motor command signal to output to the positioner motor $M_P$ by calculation based on the next output position of the positioner motor $M_P$ calculated with the next-position control means 90 and a motor output signal (current position) output from the positioner motor $M_P$ and then executes control to move the stage 5 of the positioner 2 to a position corresponding to the next output position.

(Manipulator Control Means)

The manipulator control means (arc welding robot control means) 40 instructs the manipulator motor $M_M$ for driving the manipulator 3 to reduce a speed if any check point enters the speed reduction zone. The manipulator control means 40 obtains a motor command signal to output to the manipulator motor $M_M$ based on the next output position of the manipulator motor $M_M$ calculated with the next-position control means 90 and a motor output signal (current position) output from the manipulator motor $M_M$, and then moves the welding torch 9 attached to the manipulator 3 to a position corresponding to the next output position.

(Welding Control Means)

The welding control means 50 outputs a welding command signal to the welding power source $P_W$. The welding control means 50 outputs an instruction to stop supplying welding wire (arc OFF command) to the welding power source P if the welding torch 9 continues supplying welding wire under such a condition that any one of the check points enters the speed reduction zone, that is, the speed-reduction control means 100 issues an instruction for emergency reduction.

(Coordinate Transform Means)

The coordinate transform means 60 transforms position coordinates of the positioner work origin coordinate system $(X_P, Y_P, Z_P)$ into position coordinates of the world coordinate system $(X_W, Y_W, Z_W)$ using a predetermined transform matrix. To be specific, the coordinate transform means 60 transforms the coordinate value $O_P$ (the origin fixed with respect to the work W) of the positioner work origin, which is prestored in the positioner structure storage means 24 into a coordinate value (PO) of the positioner work origin represented in the world coordinate system based on the angle, link structure, and link length of the shafts of the positioner 2, which are stored in the positioner structure storage means 24, and then overwrites the value in the coordinate transform means 60 with the transformed coordinate value (PO) of the positioner work origin and saves the new value. Further, the coordinate transform means 60 transforms a check point previously represented using position coordinates of the positioner work origin coordinate system $(X_P, Y_P, Z_P)$ into a world coordinate value (CP) and stores the transformed value in the check point storage means 25. For example, the coordinate transform means 60 transforms position coordinates of the check point determined on the basis of the positioner work origin $O_P$ into position coordinates determined on the basis of the positioner-based origin $O_W$ based on the angle of the inclination shaft 6 (the rotational angle from the vertical direction) and the link length to the positioner work origin (PO) (distance from the floor to the work origin). In this example, the position of the positioner-based origin $O_W$ is set with reference to the origin (not shown) of the world coordinate system $(X_W, Y_W, Z_W)$. Thus, the world coordinate value (CP) of the check point can be calculated.

(Check Point Updating Means)

The check point updating means 70 calculates position coordinates of the check point moved in accordance with the operation of the positioner 2 to update the position coordinate stored in the check point storage means 25. To be specific, the check point updating means 70 selects a predetermined check point (previous position) from check points stored in the temporary memory area of the check point storage means 25, and stores a previous position $(CP_{old})$ of the selected check point on the world coordinate system $(X_W, Y_W, Z_W)$ in the storage area of the check point storage means 25. Further, the check point updating means 70 determines the next position of any selected check point (previous position) on the world coordinate system $(X_W, Y_W, Z_W)$ using the next output position of the positioner motor $M_P$, and stores the resultant value in the temporary memory area of the check point storage means 25. The check point updating means 70 selects all check points from the check point storage means 25.

(Maximum Checkpoint Radius Calculating Means)

The maximum checkpoint radius calculating means 80 calculates the maximum value of a distance between the positioner work origin and each check point based on information stored in the positioner structure storage means 24 and the check point storage means 25. The calculated maximum value is referred to as "maximum checkpoint radius $R_{check}$." In this embodiment, the maximum checkpoint radius calculating means 80 calculates the maximum checkpoint radius $R_{check}$ based on a coordinate value of the world coordinate system $(X_W, Y_W, Z_W)$. Further, in FIGS. 3A and 3B, the check points are set at the same distance from the positioner work origin. In general, however, the check points are set at different distances from the positioner work origin.

(Next-Position Control Means)

The next-position control means 90 includes a next positioner position calculating means 91, a next manipulator position calculating means 92, and a speed-reducing means 93.

(Next Positioner Position Determining Means)

The next positioner position calculating means 91 calculates the next output position of the positioner motor $M_P$ for driving the positioner 2 based on a teaching program stored in the teaching program storage means 21 or an inching command from the teaching pendant 4, and outputs the calculated position to the positioner control means 30. The next positioner position calculating means 91 outputs the calculated next output position of the positioner motor $M_P$ and then restores the calculated next output position in the positional information storage means 23 as a previous output position. Further, if receiving an instruction to replace the next output position from the speed-reduction control means 100, the next positioner position calculating means 91 transforms replaces the next output position of the positioner motor $M_P$ with the previous output position stored in the positional information storage means 23, and outputs the updated position to the positioner control means 30.

(Next Manipulator Position Determining Means)

The next manipulator position calculating means 92 calculates the next output position of the manipulator motor $M_M$ for driving the manipulator 3 in response to the teaching program stored in the teaching program storage means 21 or an inching command sent from the teaching pendant 4. Further, after a motor command signal corresponding to the calculated next output position of the manipulator motor $M_M$ is output, the next manipulator position calculating means 92 restores the determined next output position as a previous output position in the positional information storage means 23.

(Speed-Reducing Means)

The speed-reducing means 93 calculates a speed (reduces a speed) to simultaneously decelerate and stop the positioner 2 and the manipulator 3 in the normal reduction time stored in the speed reduction zone storage means 22. If receiving an instruction for emergency reduction from the speed-reduction control means 100, the speed-reducing means 93 calculates a speed to simultaneously decelerate and stop the positioner 2 and the manipulator 3 in the emergency reduction time stored in the speed reduction zone storage means 22. In this embodiment, if receiving an instruction for emergency reduction from the speed-reduction control means 100, the speed-reducing means 93 outputs a warning message to the teaching pendant 4.

(Speed-Reduction Control Means)

The speed-reduction control means 100 includes a means-for-judging-necessity-of-determiantion-about-speed-reduction-zone 101, a moving direction determining means 102, an in-speed-reduction-zone determining means 103, and an operating limit determining means 104.

(Means-for-Judging-Necessity-of-Determiantion-about-Speed-Reduction-Zone)

The means-for-judging-necessity-of-determiantion-about-speed-reduction-zone 101 determines which of the operating limit line and each check point is positioned farther from the work origin on the rotating shaft 7 of the stage 5 of the positioner 2. To be specific, the means-for-judging-necessity-of-determiantion-about-speed-reduction-zone 101 determines whether a distance between a world coordinate value (PO) of the positioner work origin and all possible operating limit lines is larger than the maximum checkpoint radius $R_{check}$. This determination is performed to determine whether to judge whether each check point enters the speed reduction zone (judgment on a necessity of determination as to a speed reduction zone). If the distance between the world coordinate value (PO) of the positioner work origin and every operating limit line is larger than the maximum checkpoint radius $R_{check}$, even though the check point would enter the speed reduction zone for the next time, the check point never gets beyond all operating limit lines. Hence, the speed is not reduced in this case. As a result, a wider operating area can be secured.

(Moving Direction Determining Means)

The moving direction determining means 102 determines whether the moving direction of each check point extends to increase a distance from the operating limit line. To be specific, the moving direction determining means 102 selects an operating limit line for a target check point from the operating limit line storage means 26, and retrieves a current world coordinate value CP and the past world coordinate value $CP_{old}$ of the target check point from the check point storage means 25, and determines whether a position corresponding to CP is closer to the operating limit line than $CP_{old}$. If the position corresponding to CP is closer to the operating limit line than $CP_{old}$, the moving direction determining means 102 determines that CP gets closer to the operating limit line. For example, consider the Z- directional operating limit line. Provided that a Z component of CP is represented by CP.Z, and a Z component of $CP_{old}$ is represented by $CP_{old}.Z$, if $CP.Z < CP_{old}.Z$, CP gets closer to the operating limit line. If CP gets closer to the operating limit line as described above, the moving direction determining means 102 sends an instruction for emergency stop to the next-position control means 90 and welding control means 50. On the other hand, if CP stays away from the operating limit line, no instruction is issued. Thus, the speed-reducing means 93 does not reduce a speed. As a result, a wider operating area can be secured. Further, the moving direction determining means 102 selects all operating limit lines from the operating limit line storage means 26.

(In-Speed-Reduction-Zone Determining Means)

The in-speed-reduction-zone determining means 103 determines whether any check point enters the speed reduction zone based on the updated position coordinates of the check point. To be specific, the in-speed-reduction-zone determining means 103 retrieves a world coordinate value (CP) of a target check point from the check point storage means 25 and also selects a speed reduction zone width from the speed reduction zone storage means 27, and then determines whether the target check point enters the speed reduction zone. If the target check point enters the speed reduction zone as a result of the determination, the in-speed-reduction-zone determining means 103 instructs the speed-reducing means 93 to start emergency stop and issues an instruction for emergency stop.

(Operating Limit Determining Means)

The operating limit determining means 104 determines whether any check point gets closer to an obstacle beyond an operating limit line. To be specific, the operating limit determining means 104 retrieves an operating limit line for a target check point from the operating limit line storage means 26 and also selects a current world coordinate value CP of the target check point from the check point storage means 25, and then determines whether CP crosses the operating limit line. If CP gets beyond the operating limit line as a result of the determination, the operating limit determining means 104 instructs the next positioner position calculating means 91 to replace the next output position.

[Operation of Control Device]

Figure 5:
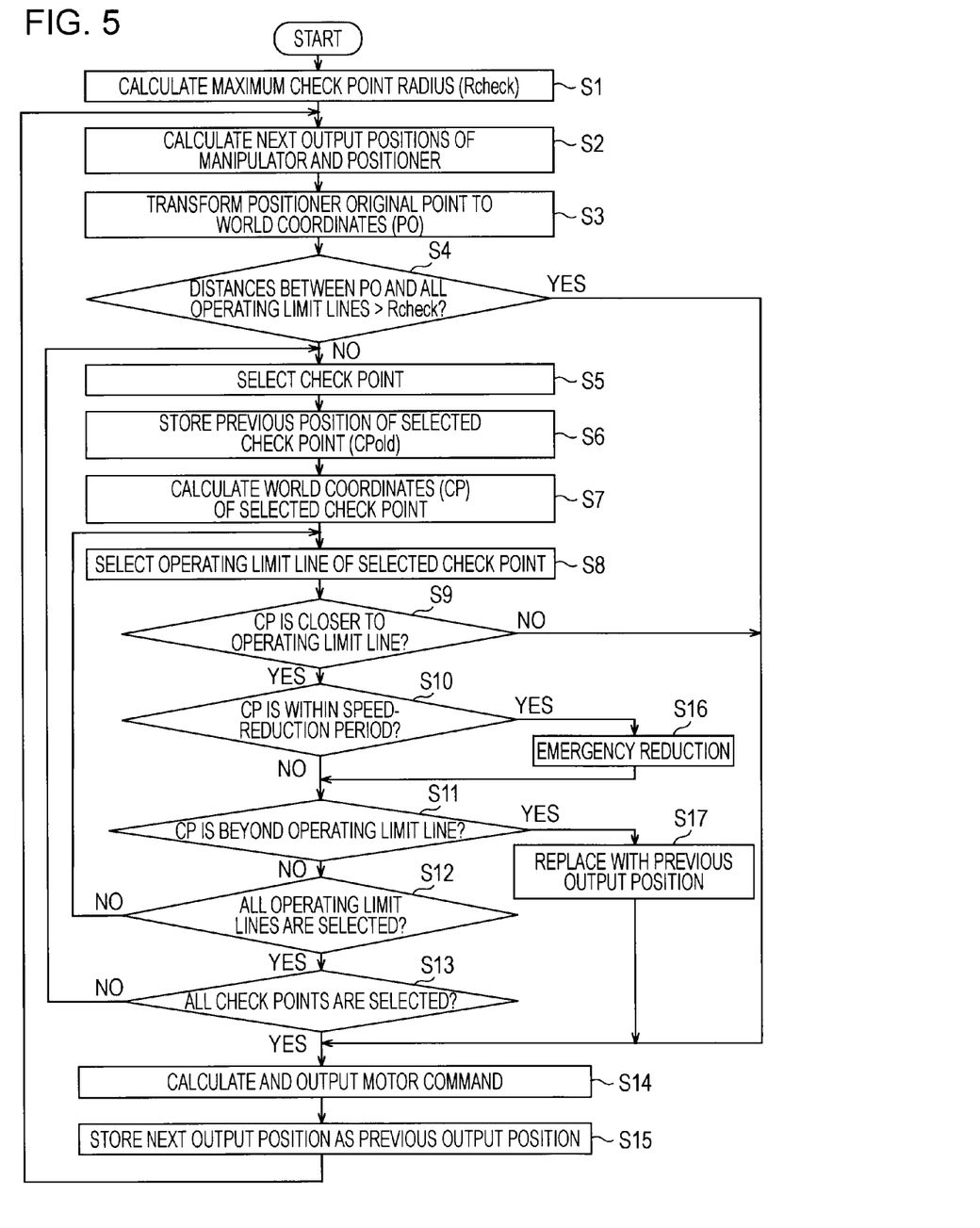
FIG. 5 is a flowchart of an operation of the control device of FIG. 2.

Referring next to FIG. 5, an operation of the control device 1 is described (optionally referring to FIG. 1 to FIG. 4). FIG. 5 is a flowchart of an operation of the control device of FIG. 2. The control device 1 calculates the maximum checkpoint radius ($R_{check}$) in advance with the maximum checkpoint radius calculating means 80 (step S1). Then, the control device 1 determines the next output position of the positioner with the next positioner position calculating means 91 based on a teaching program stored in the teaching program storage means 21 or an inching command from the teaching pendant 4, and calculates the next output position of the manipulator with the next manipulator position calculating means 92 (step S2).

Subsequently, the control device 1 transforms the coordinate value $O_P$ of the positioner work origin prestored in the positioner structure storage means 24 into a world coordinate value (PO) with the coordinate transform means 60 (step S3). Then, the control device 1 determines whether a distance between the world coordinate value (PO) of the positioner work origin and every operating limit line is larger than the maximum checkpoint radius $R_{check}$ with the means-for-judging-necessity-of-determiantion-about-speed-reduction-zone 101 (step S4).

In step S4, if the condition that a distance between the world coordinate value (PO) of the positioner work origin and every operating limit line is larger than the maximum checkpoint radius $R_{check}$ is not met (step S4: NO), the control device 1 selects a predetermined check point from the check point storage means 25 with the check point updating means 70 (step S5), and stores a previous position ($CP_{old}$) of the selected check point on a world coordinate system to a storage area of the check point storage means 25 (step S6). The check point updating means 70 calculates the next position (CP) of the selected check point on the world coordinate system based on the next output position of the positioner motor $M_P$ (step S7). Next, the control device 1 selects an operating limit line for the selected check point (step S8), and determines whether a current world coordinate value CP of the selected check point is closer to the operating limit line than the past world coordinate value $CP_{old}$ with the moving direction determining means 102 (step S9).

In step S9, if CP is closer to the operating limit line than $CP_{old}$ (step S9: YES), the control device 1 determines whether a current world coordinate value CP of the selected check point is within the speed reduction zone with the in-speed-reduction-zone determining means 103 (step S10). If CP is not within the speed reduction zone (step S10: NO), the control device 1 determines whether a current world coordinate value CP of the selected check point gets beyond the operating limit line with the operating limit determining means 104 (step S11).

In step S11, if CP does not get beyond the operating limit line (step S11: NO), the control device 1 determines whether all operating limit lines for the selected check point have been selected with the moving direction determining means 102 (step S12). If some of the operating limit lines for the selected check point have not been selected (step S12: NO), the control device 1 returns to step S8. On the other hand, if all operating limit lines for the selected check point have been selected (step S12: YES), the control device 1 determines whether all check points are selected from the check point storage means 25 with the check point updating means 70 (step S13). If some of the check points have not been selected (step S13: NO), the control device 1 returns to step S5. On the other hand, if all check points have been selected (step S13: YES), the control device 1 obtains a motor command signal based on the next output position of the positioner motor $M_P$ and the motor output signal (current position) with the positioner control means 30, and outputs the signal to the positioner motor $M_P$ (step S14). Then, the control device 1 stores the next output position of the positioner motor $M_P$ as a previous output position with the next positioner position calculating means 91, and stores the next output position of the manipulator motor $M_M$ as a previous output position with the next manipulator position calculating means 92 (step S15). Then, the control device 1 returns to step S2.

In step S4, if a distance between the world coordinate value PO of the positioner work origin and every operating limit line is larger than the maximum checkpoint radius $R_{check}$ (step S4: YES), the control device 1 skips steps S5 to S13 and advances to step S14. Further, if $CP_{old}$ is closer to the operating limit line than CP in step S9 (step S9: NO), that is, if CP stays away from the operating limit line, the control device 1 skips steps S10 to S13 and advances to step S14.

Further, if CP is within the speed reduction zone in step S10 (step S10: YES), the control device 1 sends an instruction for emergency stop to the speed-reducing means 93 with the in-speed-reduction-zone determining means 103 (step S16), and advances to step S11. In response to the instruction for emergency stop, the speed-reducing means 93 calculates a speed to simultaneously decelerate and stop the positioner 2 and the manipulator 3 in the emergency reduction time and also outputs a warning message to the teaching pendant 4. Thus, the teaching pendant beeps out a warning indicating an error. Further, the welding control means 50 sends an arc OFF command to stop supply or welding wire from the welding torch 9.

Further, in step S11, if CP gets beyond the operating limit line (step S11: YES), the control device 1 instructs the next positioner position calculating means 91 to replace the next output position with the operating limit determining means 104 (step S17), and skips steps S12 and S13 and advances to step S14. With the processing in step S17, the next output positions of the positioner motor $M_P$ and the manipulator motor $M_M$ output from the next positioner position calculating means 91 to the positioner control means 30 are replaced with a corresponding previous output position stored in the positional information storage means 23, and the positioner motor $M_P$ and the manipulator motor $M_M$ are brought to an emergency stop. In the case where the control device 1 skips step S16 and makes positive determination (YES) in step S11, if the teaching pendant neither beeps out a warning indicating an error nor stops supplying welding wire, the control device causes the teaching pendant to beep out a warning indicating an error and stop supplying welding wire as in step S16.

The control device 1 can be implemented by a generally available computer operating in accordance with a program for executing functions of the above-described means. This program may be downloaded through a communication line or distributed in the form of being written to a storage medium such as a CD-ROM or a flash memory.

According to this embodiment, the control device 1 stores an operating limit line, a speed reduction zone, and position coordinates of each check point, which are preset in accordance with a coasting period or distance corresponding to a stop time of the positioner 2, and instructs the positioner motor $M_P$ to reduce a speed if any one check point enters the speed reduction zone in accordance with the operation of the positioner 2. Thus, the work W fixed to the positioner 2 can be securely prevented from colliding against the obstacle.

Figure 6A:
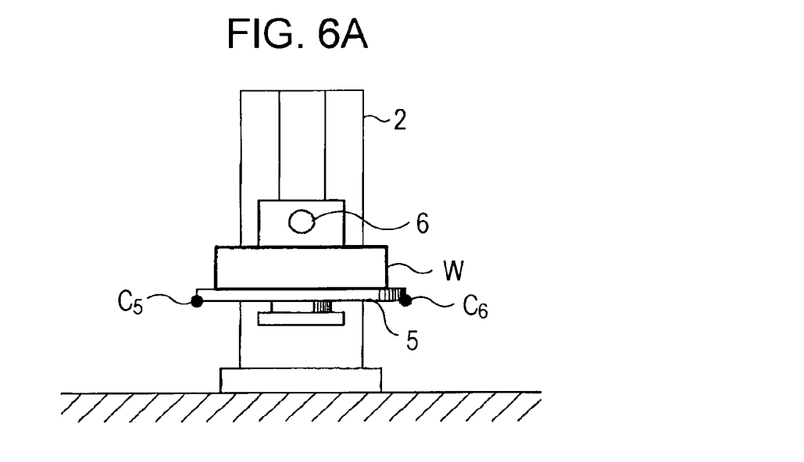
FIGS. 6A and 6B are side views thereof as viewed from a positive direction of an X axis.

The above description is given of the preferred embodiment of the present invention, but the present invention is not limited to the above embodiment. For example, in this embodiment, the control device 1 executes control to prevent the work W fixed to the stage 5 from colliding against an obstacle through the operation of the positioner 2, but the present invention is not limited thereto. The control device may execute control to prevent the stage 5 or a link from colliding against an obstacle through the operation of the positioner 2. In this case, for example, check points $C_5$ and $C_6$ can be set at the bottom edge of the stage 5, not the work W as shown in FIG. 6A.

Figure 6B:
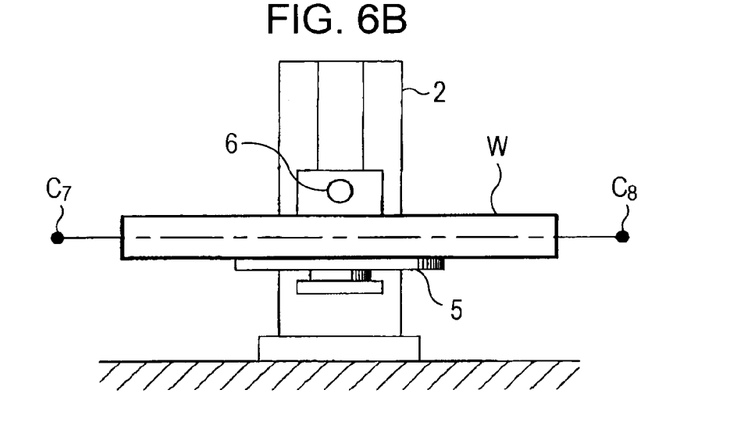

Further, the check points may be set in any positions other than the bottom edge of the work W or the stage 5; for example, check points $C_7$ and $C_8$ may be set in an area away from the work W by a predetermined distance as shown in FIG. 6B.

Figure 6C:
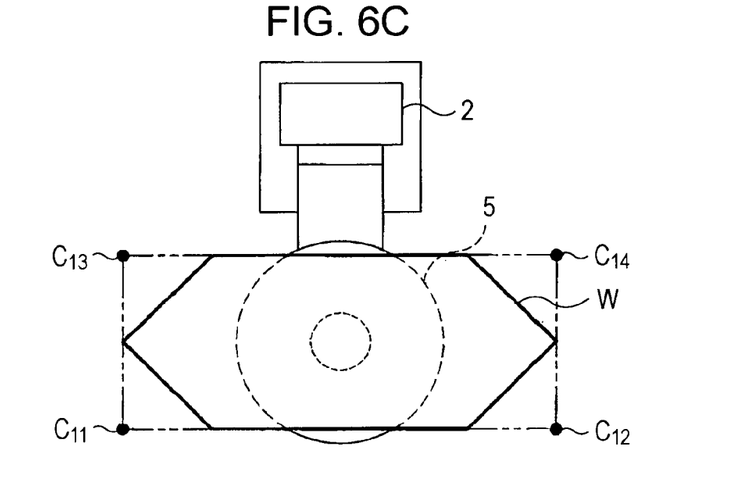
FIG. 6C is a plan view thereof as viewed from a Z axis.

Further, the work W is not limited to a rectangular shape in a plan view but may have, for example, a hexagonal shape in a plan view as shown in FIG. 6C. Besides, the work W may take any other polygonal shape or circular shape. For example, if the work W is hexagonal one as shown in FIG. 6C, check points $C_{11}$ to $C_{14}$ can be set to four vertexes (in a space) connecting the most protruding points in the X-axis direction and Y-axis direction.

In this embodiment, the operating limit line is determined using a coordinate value of the world coordinate system as a parameter but may be determined using a coordinate value of a robot-based coordinate system fixed in the manipulator 3 as a parameter. In this case, a coordinate value of the operating limit line can be easily changed in accordance with position coordinates of the manipulator 3.

In this embodiment, one operating limit line is determined with respect to an obstacle in one direction, but plural operating limit lines may be set with respect to an obstacle in one direction for each work W. Moreover, plural operating limit lines may be set with respect to an obstacle in one direction for each layout of the work W on the stage 5.

Further, in the case of preventing the positioner 2, not the work W, from colliding against an obstacle under the control, it is possible to determine an operating limit line or a speed reduction zone for the positioner 2.

In this embodiment, the speed-reduction control means 100 of the control device 1 includes the means-for-judging-necessity-of-determiantion-about-speed-reduction-zone 101, the moving direction determining means 102, the in-speed-reduction-zone determining means 103, and the operating limit determining means 104 as the best mode, but only the in-speed-reduction-zone determining means 103 is dispensable, and the other components can be omitted.

EXAMPLES

Figure 7A:
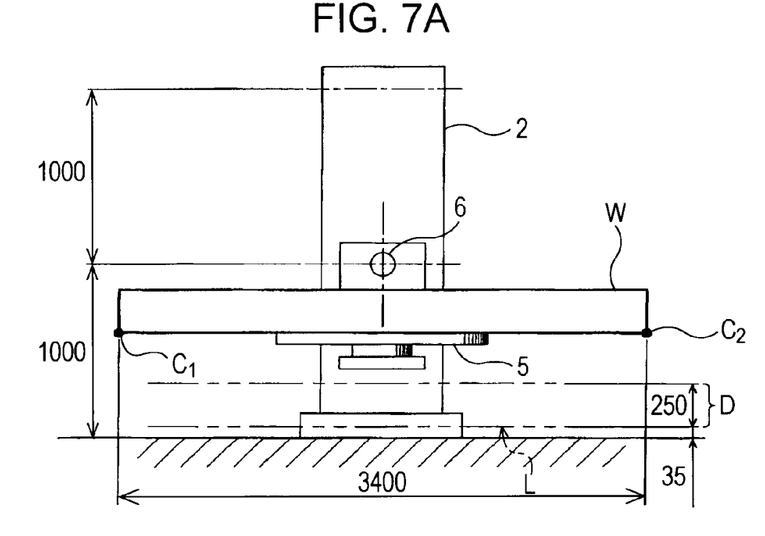
FIGS. 7A and 7B illustrate a specific example of a speed reduction zone and an operating limit line set in an embodiment of the present invention.
Figure 7B:
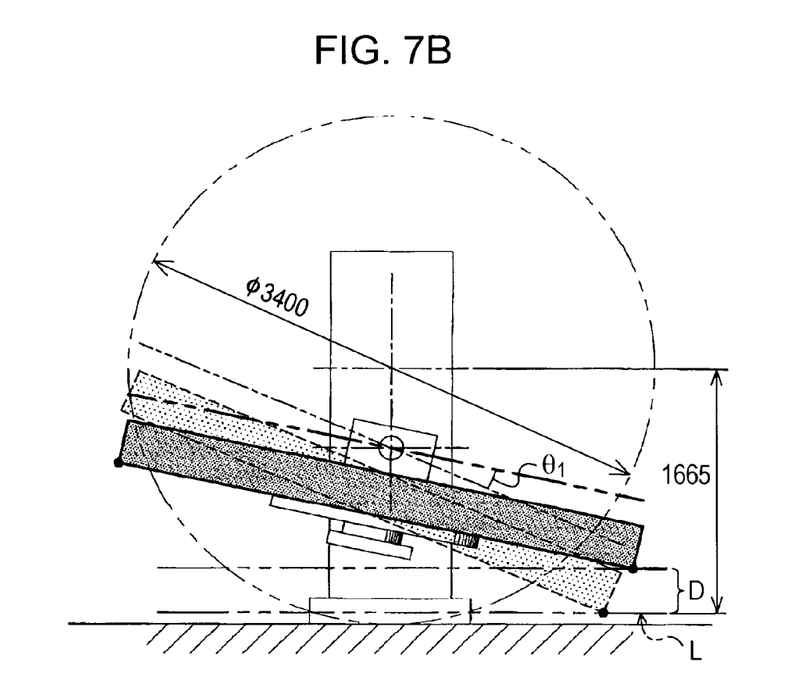

To confirm advantages of the present invention, a relationship between parameters set in the control device 1 of this embodiment is examined. FIGS. 7A and 7B illustrate a specific example of a speed reduction zone and an operating limit line set in the embodiment. In the example of FIG. 7A, the stage 5 of the positioner 2 was moved to the lowest position along the vertical shaft. Further, a width of the work W fixed to the stage 5 (in the Y direction) was set to "3400 mm". Further, the check points $C_1$ and $C_2$ were set at both ends of the bottom of the work W in a width direction. Further, a 1000 mm-high position on the rotating shaft of the stage 5 from the floor was set as the positioner work origin for alignment with the inclination shaft 6. Further, the positioner origin of the world coordinate system $(X_W, Y_W, Z_W)$ was set to a predetermined position on the floor. Further, the operating limit line L was set as "Z– direction 35 mm". Further, the speed reduction zone D was set as "Z– directional speed-reduction start position 250 mm". The speed reduction zone D obtained if a coasting distance of on the vertical shaft of the positioner 2 is "20 mm", and a coasting angle of the inclination shaft necessary to reduce the speed from the maximum speed to the halt is "8.6 deg".

In the example of FIG. 7B, the stage 5 of FIG. 7A is tilted and the check point $C_2$ reaches the speed-reduction start position. In FIG. 7, the broken line indicates the inclined work on the assumption that the stage 5 is more tilted and the check point $C_2$ reaches the operating limit line L. In this case, a difference $\theta_1$ between the inclination shaft angle at which the check point $C_2$ reaches the speed-reduction start position and the inclination shaft angle at which the check point $C_2$ reaches the operating limit line L is "9.3 deg".

Further, as shown in FIG. 7B, if the stage 5 is moved upward by 655 mm or more from the lowest position along the vertical shaft, that is, the center of the inclination shaft is set at the height of "1665 mm ore more" from the floor, since the perimeter of the stage having the radius of 1700 mm (diameter of φ3400 mm) similar to the width of the work W never exceed the operating limit line L, the check point $C_2$ never gets beyond the operating limit line L. Thus, if the stage 5 is set at the height of 655 mm or more from the lowest position, even through the check point $C_2$ enters the speed reduction zone D, the device does not beep a warning indicating an error, and the positioner 2 can normally operate.

What is claimed is:

1. A control device of a work positioning apparatus for controlling the work positioning apparatus including a stage for fixing a work, and an inclination shaft, a rotating shaft, and a vertical shaft for securing the fixed work in a predetermined position in a three-dimensional space, comprising:

operating limit line storage means for storing position coordinates of an operating limit line that is preset in front of a predetermined obstacle with respect to the work positioning apparatus or the work fixed to the work positioning apparatus;

speed reduction zone storage means for storing a width of a speed reduction zone ranging from a reduction start position preset in front of the operating limit line to the operating limit line;

check point storage means for storing position coordinates of one or more check points set in the work positioning apparatus or the work fixed to the work positioning apparatus;

check point updating means for determining position coordinates of the one or more check points moved in accordance with an operation of the work positioning apparatus by calculation to update position coordinates stored in the check point storage means;

in-speed-reduction-zone determining means for determining whether any one of the check points enters the speed reduction zone in accordance with the updated position coordinates of the check points; and work positioning apparatus control means for instructing a work positioning apparatus motor for driving the work positioning apparatus to reduce a speed if any one of the check points is determined to enter the speed reduction zone.

2. The control device of a work positioning apparatus according to claim 1, wherein the work fixed to the work positioning apparatus is welded with a welding wire supplied from a welding torch attached to an arc welding robot, and the control device further comprises:

arc welding robot control means for instructing an arc welding robot motor for driving the arc welding robot to reduce a speed if any one of the check points enters the speed reduction zone; and welding control means for instructing the welding torch to stop supplying the welding wire if any one of the check points enters the speed reduction zone.

3. The control device of a work positioning apparatus according to claim 2, wherein the speed reduction zone is set using a distance from the operating limit line as a parameter.

4. The control device of a work positioning apparatus according to claim 2, further comprising:

means-for-judging-necessity-of-determination-about-speed-reduction-zone for determining which of the operating limit line and any one of the check points is positioned farther from a work origin of the work positioning apparatus on a rotating shaft for rotating the stage, wherein if any one of the check points is farther from the work origin as a result of the position determination, the work positioning apparatus control means instructs the work positioning apparatus motor to reduce a speed, the arc welding robot control means instructs the arc welding robot motor to reduce a speed, and the welding control means instructs the welding torch to stop supplying the welding wire.

5. The control device of a work positioning apparatus according to claim 2, further comprising:

moving direction determining means for determining whether a moving direction of any one of the check points extends to increase a distance from the operating limit line, wherein if a moving direction of any one of the check points extends to decrease a distance from the operating limit line as a result of the moving direction determination, and any one of the check points enters the speed reduction zone, the work positioning apparatus control means instructs the work positioning apparatus motor to reduce a speed, the arc welding robot control means instructs the arc welding robot motor to reduce a speed, and the welding control means instructs the welding torch to stop supplying the welding wire.

6. The control device of a work positioning apparatus according to claim 5, further comprising:

speed reduction zone storage means for storing an emergency reduction time shorter than a normal reduction time as a reduction time detected when a halt command is externally input, wherein if a moving direction of any one of the check points extends to decrease a distance from the operating limit line as a result of the moving direction determination, the work positioning apparatus control means instructs the work positioning apparatus motor to reduce a speed in the emergency reduction time.

7. The control device of a work positioning apparatus according to claim 2, further comprising:

operating limit determining means for determining whether any one of the check points approaches an obstacle beyond the operating limit line, wherein if any one of the check points is beyond the operating limit line, the work positioning apparatus control means instructs the work positioning apparatus motor to rotate to move an approaching check point back to position coordinates updated before the approaching check point gets beyond the operating limit line.

8. The control device of a work positioning apparatus according to claim 1, wherein the operating limit line is set using a coordinate value of a world coordinate system using a parameter.

9. The control device of a work positioning apparatus according to claim 1, wherein the operating limit line is set using a coordinate value of a robot-based coordinate system, which is fixed in an arc welding robot, as a parameter.

* * * * *